Figure 1:
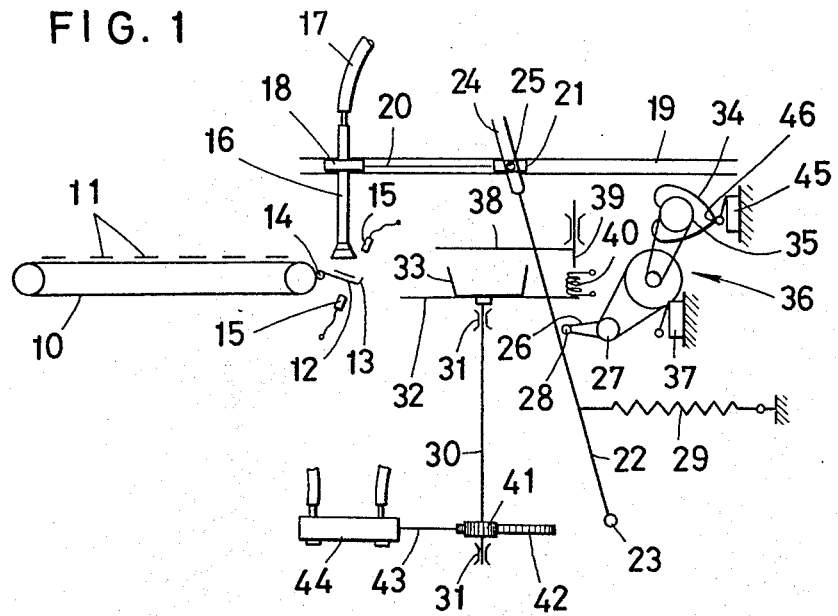

United States Patent [19]

Yamamoto

[11] 3,951,274
[45] Apr. 20, 1976

[54] APPARATUS FOR LOADING SLIDE FASTENERS OR THE LIKE INTO A RECEPTACLE IN NEAT ARRANGEMENT

[75] Inventor: Yasuaki Yamamoto, Uji, Japan

[73] Assignee: Yoshida Kogyo Kabushiki Kaisha, Japan

[22] Filed: Aug. 29, 1974

[21] Appl. No.: 501,782

[52] U.S. Cl. .............. 214/6 FS; 214/1 BT; 214/6.5; 214/7; 271/194
[51] Int. Cl.² ........................... B65G 57/04
[58] Field of Search ............ 214/1 BT, 6 FS, 6 DS, 214/6 A, 6 N, 6.5, 7, 8.5 D; 271/30 R, 84, 118, 194, 213; 29/207.5 R

[56] References Cited
UNITED STATES PATENTS

| | | | |
|---|---|---|---|
| 3,090,502 | 5/1963 | Gunzelmann | 214/6 A |
| 3,586,176 | 6/1971 | Rackman et al. | 214/6 P |
| 3,595,370 | 7/1971 | Fujishiro | 214/6.5 X |
| 3,599,807 | 8/1971 | Hedrick et al. | 214/6.5 |
| 3,601,396 | 8/1971 | Rovin | 271/194 X |
| 3,620,383 | 11/1971 | Ingram et al. | 214/6 FS X |
| 3,749,256 | 7/1973 | Hill et al. | 214/6 FS X |

FOREIGN PATENTS OR APPLICATIONS

| | | | |
|---|---|---|---|
| 1,283,155 | 11/1968 | Germany | 214/7 |

Primary Examiner—Robert J. Spar
Assistant Examiner—L. J. Paperner
Attorney, Agent, or Firm—Bucknam and Archer

[57] ABSTRACT

A tubular suction member is provided which has a suction port at its bottom end and which reciprocates between a first position over a receiving plate and a second position over an open-top receptacle mounted on a rotatable platform. Manufactured slide fasteners or like articles are successively deposited onto the receiving plate and are carried away by the suction member to the second position, where each article is caused to drop into the receptacle. Cam means is provided for arresting the travel of the suction member from its first to second position, the cam means rotating through a preassigned angle during each complete reciprocation of the suction member from its second to first and back to second position, whereby the successive articles dropped into the receptacle are arranged in neat side-by-side relationship therein. The platform can be rotated 180° in a horizontal plane each time two consecutive layers of the articles are formed in the receptacle, in order to prevent the layered articles, especially the slide fasteners each carrying a slider on one end thereof, from collapsing.

9 Claims, 8 Drawing Figures

APPARATUS FOR LOADING SLIDE FASTENERS OR THE LIKE INTO A RECEPTACLE IN NEAT ARRANGEMENT

This invention relates to apparatus for loading articles into a receptacle in neat side-by-side arrangement and, if desired, in a plurality of layers. The apparatus is particularly well adapted for handling completed slide fasteners in a slide fastener manufacturing plant in the manner above set forth, although it is open to various other applications without any substantial modification of its structural or operational features.

An object of this invention is to provide novel apparatus for automatically loading completed slide fasteners or like articles into a receptacle in near arrangement, such that they are ready for immediate shipment.

Another object of the invention is to provide apparatus of the above described character whereby the articles can be neatly arranged in the receptacle in a plurality of layers each consisting of a prescribed number of the articles.

Another object of the invention is to provide apparatus of the above described character which, in view of the fact that slide fasteners carry their respective sliders each on one end thereof, includes means for forming their layers in such a pattern that the possibility of collapsing is substantially precluded.

With these and other objects in view, the invention provides apparatus including a receiving plate onto which articles are successively deposited as from a constantly moving belt conveyor. A suction member communicating with a source of vacuum is provided which reciprocates between a first position over the receiving plate and a second position over an open-top receptacle mounted on a rotatable platform. Each article on the receiving plate is caused to attach to the suction member by suction exerted through its port and is thereby carried over to the second position, where the article is dropped into the receptacle.

According to a preferred embodiment of the invention hereinafter disclosed, cam means is provided which horizontally shifts the second position of the suction member by suitable increments relative to the receptacle each time the suction member brings the article from the receiving plate, so that the successive articles can be neatly arranged in the receptacle in side-by-side relationship. The cam is of such contour that the horizontal shifting of the second position of the suction member takes place in one direction until a predetermined number (for example, ten) of articles are loaded into the receptacle, and then in the opposite direction until the same number of articles are again loaded thereinto. The articles can thus be layered in the receptacle.

Where slide fasteners are to be handled by the apparatus, it must be taken into account that each fastener carries a slider thereon. Should these slide fasteners be arranged in a multiplicity of layers with their directions unchanged, their slider-carrying ends would become considerably higher that the opposite ends, thereby inviting the possibility of collapsing. In order to obviate this, the receptacle together with its platform is angularly displaced 180° in a horizontal plane each time two consecutive layers, for example, of the slide fasteners are formed in the receptacle. It is possible in this manner to substantially preclude the possibility of collapsing of the layered slide fasteners.

The features which are believed to be novel and characteristic of this invention are set forth with particularity in the appended claims. The invention itself, however, both as to its organization and mode of operation, together with the further objects and advantages thereof, will be best understood from the following description of a preferred embodiment when taken in conjunction with the accompanying drawings wherein like reference characters denote corresponding parts of the several views.

Figure 4:
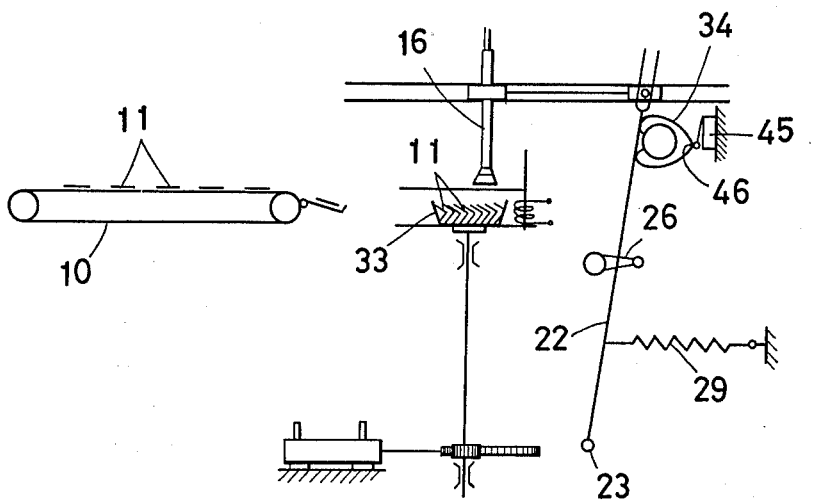
Figure 5:
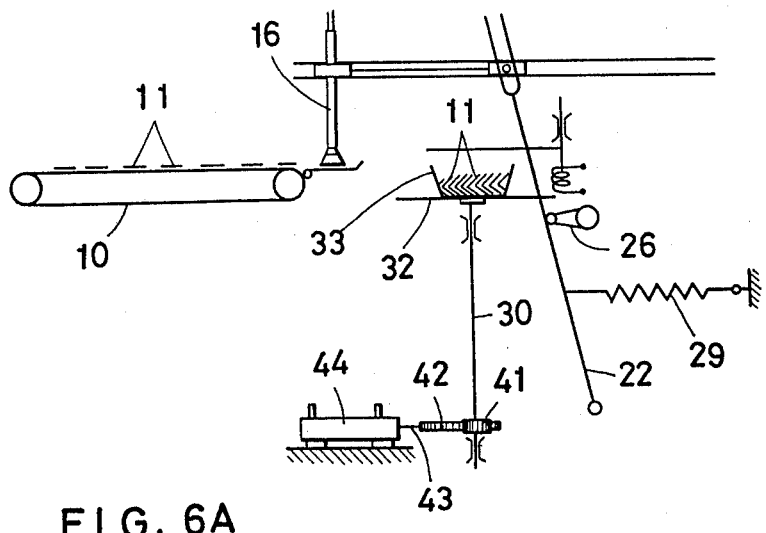
Figure 6A:
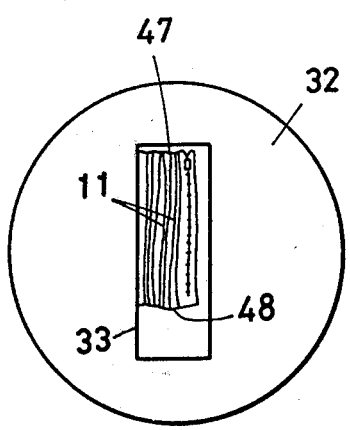
Figure 6C:
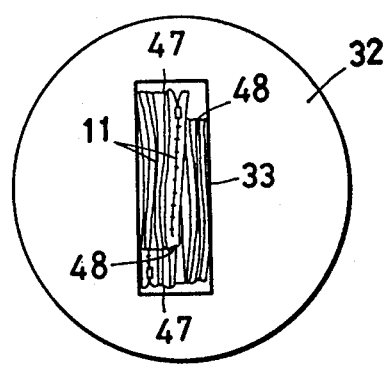
Figure 6B:
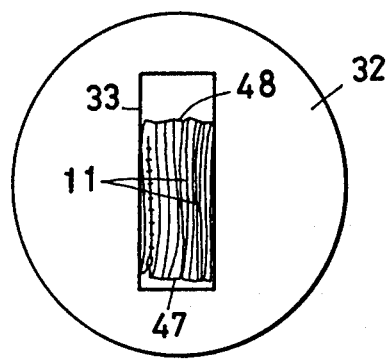

FIG. 1 is a schematic side elevational view of the apparatus constructed in accordance with the novel concepts of this invention, the view being also explanatory of the initial step in the operation of the apparatus;

FIGS. 2 to 5 inclusive are views similar to FIG. 1 which sequentially illustrate the succeeding steps in the operation of the apparatus; and FIGS. 6A to 6C inclusive are enlarged top plan views explanatory of a loading pattern of slide fasteners in a receptacle in the apparatus of FIG. 1.

The apparatus according to the invention will now be described in greater detail in connection with the accompanying drawings wherein the apparatus is specifically adapted for use with completed slide fasteners in a slide fastener manufacturing plant. With particular reference to FIG. 1, the reference numeral 10 denotes a conveyor which can be in the form of an endless moving belt operating over a pair of terminal pulleys. The belt conveyor 10 has a loading end, seen to the left in FIG. 1, and an unloading end remote from the loading end. Completed slide fasteners 11 are successively loaded transversely on the belt conveyor 10 at its loading end by suitable means, not shown, and are thereby transported toward the unloading end at prescribed spacings from one to the next.

A fastener receiving plate 12 having an end stop 13 is pivotally supported at 14 adjacent the unloading end of the belt conveyor 10. Shown at 15 are photoelectric means for sensing in the well known manner each slide fastener 11 as the same is unloaded onto the fastener receiving plate 12 from the belt conveyor 10. Although not shown in the drawings, it is assumed that known means are provided which, each time the fastener receiving plate 12 receives the slide fastener from the belt conveyor 10, cause the fastener receiving plate to swing from its tilted to horizontal disposition about the pivot 14 in response to the output signal from the photoelectric sensing means 15.

A tubular suction member 16 having a suction port at its bottom end communicates with a vacuum pump or like source of vaccum, not shown, via a pressure conduit 17. Hence, as a desired degree of vacuum is created within the suction member 16, each slide fastener 11 on the fastener receiving plate 12 will be attached to the bottom end of the suction member by suction exerted through its suction port, as later explained in more detail. The suction member 16 extends vertically and is supported by an integral flange 18 which is slidably received in a horizontal guide channel 19. The flange 18 is rigidly coupled via a link 20 to a slider 21 which also is slidably received in the guide channel 19.

An elongate lever 22 is pivotally supported at 23. The free end of this lever 22 is bifurcated at 24 to slidably receive a pin 25 projecting horizontally from the slider 21. Therefore, as the lever 22 swings clockwise, as seen in FIG. 1, about its pivot 23, the slider 21 will slide rightwardly along the guide channel 19 thereby causing the suction member 16 to travel in the same direction via the link 20 and the flange 18. As the lever 22 swings counterclockwise, on the other hand, the suction member 16 will travel leftwardly as guided by the guide channel 19. It will be apparent that the vertical disposition of the suction member 16 remains unchanged during its reciprocation along the guide channel 19.

A crank 26 formed substantially integral with a rotatable crankshaft 27 terminates in an abutment 28 which may be in the form of an offset pin and which is disposed for sliding abutment against the lever 22. This lever 22 is biased as by a tension spring 29 to turn clockwise about the pivot 23. Therefore, as the crankshaft 27 is rotated clockwise with the crank 26 as by an electric drive motor, not shown, the abutment 28 sliding over the lever 22 will cause the same to swing counterclockwise against the bias of the tension spring 29. When the crank 26 assumes a horizontal position on the left hand side of the crankshaft 27, as illustrated in FIG. 1, the suction member 16 will move into vertical register with the fastener receiving plate 12.

It is assumed that the crankshaft 27 is connected to the aforesaid drive motor via a clutch-and-brake mechanism of well known construction, not shown, which operates to arrest the rotation of the crankshaft each time the crank 26 assumes the angular position of FIG. 1. As the fastener receiving plate 12 swings as aforesaid to the horizontal position in response to the output signal from the photoelectric sensing means 15, a limit switch, not shown, is actuated to engage the clutch and to release the brake, thereby recommencing the clockwise rotation of the crankshaft 27 and hence of the crank 26 from the angular position of FIG. 1. With the clockwise rotation of the crankshaft 27 thus recommenced, the lever 22 will swing clockwise in sliding contact with the abutment 28 under the bias of the tension spring 29.

Mounted vertically between the belt conveyor 10 and the lever 22 is a shaft 30 which is rotatably journaled in bearings 31. A platform 32 is fixedly supported on the top of the rotatable shaft 30, and a substantially rectangular, open-top receptacle 33 of suitable depth is placed upon the platform 32 for reception of the successive slide fasteners 11.

Figure 2:
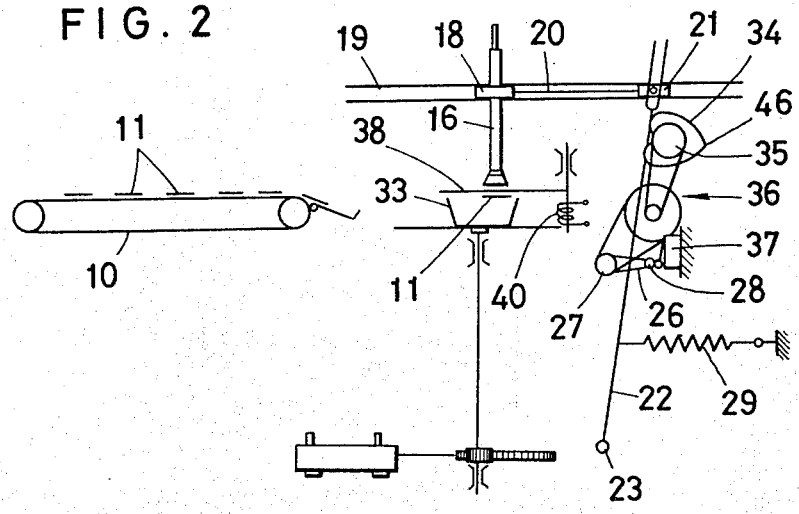

A heart cam 34 is fixedly mounted on a rotatable camshaft 35. When the lever 22 swings clockwise under the influence of the tension spring 29 to such an angular position that the suction member 16 is located over the receptacle 33 on the platform 32, as illustrated in FIG. 2, the heart cam 34 will function as a stop to limit the clockwise swing of the lever 22. The rotation of the crankshaft 27 is conveyed to the camshaft 35 via a belt-and-pulley arrangement 36 or the like which is effective to reduce the speed of crankshaft rotation to, say, one twentieth.

A limit switch 37 is mounted adjacent the crankshaft 27 so as to be actuated by the abutment 28 on the free end of the crank 26 when the same assumes a horizontal position on the right hand side of the crankshaft as shown in FIG. 2. A fastener separator 38 arranged horizontally above the receptacle 33 on the platform 32 is rigidly coupled to the plunger 39 of a solenoid having a coil 40. Although not clearly seen in the drawings, it is assumed that the fastener separator 38 has a pair of spaced apart prongs capable of loosely accepting the suction member 16 therebetween when the latter travels rightwardly along the guide channel 19. The solenoid coil 40 is adapted to be energized upon actuation of the limit switch 37, whereupon the fastener separator 38 descends past the bottom end of the suction member 16 to separate the slide fastener 11 away from its suction port and hence to drop the slide fastener into the receptacle 33.

A pinion 41 is fixedly mounted on the rotatable shaft 30 supporting the platform 32 thereon. The pinion 41 meshes with a rack 42 formed substantially integral with the piston rod 43 of a cylinder 44 which may be actuated pneumatically. This rack-and-pinion arrangement is such that the shaft 30 will rotate 180 degrees each time the piston rod 43 of the cylinder 44 moves on its forward or return stroke.

A limit switch 45 is mounted adjacent the heart cam 34 so as to be actuated by its pointed tip 46 as shown in FIG. 4. In other words, the limit switch 45 is actuated each time the heart cam 34 makes one complete revolution. The actuation of this limit switch 45 results in the actuation of the cylinder 44, causing its piston rod 43 to advance or retract to impart 180° rotation to the shaft 30 and hence to the receptacle 33 in either direction.

In operation, an empty receptacle 33 is first placed in a prescribed position on the platform 32. The manufactured slide fasteners 11 to be loaded into this receptacle are then successively and continuously loaded on the belt conveyor 10 at its loading end so as to generally extend transversely thereof, with a prescribed spacing from one to the next. It is assumed that at this juncture the crank 26 is held stationary in the angular position of FIG. 1 and, therefore, that the suction member 16 is held standing by in its position over the fastener receiving plate 12, also as seen in FIG. 1.

As the foremost one of the slide fasteners 11 that have been loaded on the belt conveyor 10 is unloaded onto the fastener receiving plate 12, the photoelectric sensing means 15 functions to cause the fastener receiving plate to swing from its tilted to horizontal disposition about its pivot 14. The slide fastener on the fastener receiving plate 12 is thus caused to attach by suction to the suction port of the suction member 16. The upward swing of the fastener receiving plate 12 also results in the actuation of the unshown limit switch as previously mentioned, thereby engaging the clutch and releasing the brake between the crankshaft 27 and the drive motor. The crank 26 thus starts revolving clockwise to initiate the clockwise swing of the lever 22 about the pivot 23 under the influence of the tension spring 29. This clockwise swing of the lever 22 is translated into the rightward travel of the suction member 16, together with the slide fastener 11 attached to its suction port, along the guide channel 19 via the pin 25, the slider 21, the link 20 and the flange 18.

As the crank 26 revolves to such an angular position that the suction member 16 together with the slide fastener 11 is located over the receptacle 33, the clockwise swing of the lever 22 is arrested by the heart cam 34 as illustrated in FIG. 2. Although the crank 26 continues revolving with the crankshaft 27, the suction member 16 is held stationary in a predetermined position over the receptacle 33 after the lever 22 has moved into abutting engagement with the heart cam 34.

Thereafter, as the crank 26 revolves to the angular position of FIG. 2, its abutment 28 actuates the limit switch 37 thereby causing the solenoid coil 40 to become energized. Upon energization of the solenoid coil 40, the fastener separator 38 descends to press the slide fastener 11 downwardly away from the suction port of the suction member 16, and the thus-separated slide fastener drops by gravity into the receptacle 33 on the platform 32.

With the continued clockwise revolution of the crank 26, its abutment 28 again moves into sliding contact with the lever 22, so that the lever starts swinging counterclockwise against the bias of the tension spring 29. The suction member 16 is thus caused to move back toward the fastener receiving plate 12 along the guide channel 19. When the crank 26 again assumes the angular position of FIG. 1 so that the suction member 16 moves into vertical register with the fastener receiving plate 12, the rotation of the crankshaft 27 is suspended by the clutch-and-brake mechanism. The suction member 16 is thus held standing by over the fastener receiving plate 12 pending the unloading of the next slide fastener 11 from the belt conveyor 10.

The next slide fastener 11 unloaded from the belt conveyor 10 onto the fastener receiving plate 12 is succeedingly carried away therefrom by the suction member 16 and is deposited into the receptacle 33 through the same procedure as that above described. It may be recalled, however, that the rotation of the crankshaft 27 is being conveyed to the camshaft 35 via the belt-and-pulley arrangement 36, with the speed of the crankshaft rotation reduced to one twentieth. Consequently, the heart cam 34 is angularly displaced 18 degrees in, for example, the clockwise direction from the moment the lever 22 precedingly swung clockwise into abutting contact with the heart cam to the moment the lever swings this time into abutting contact therewith. It will therefore be understood that the heart cam 34 arrests the clockwise swing of the lever 22 in a position angularly displaced more in the counter-clockwise direction than the FIG. 2 position where the lever was precedingly restrained from its clockwise swing. The rightward travel of the suction member 16 likewise stops in a position correspondingly shifted to the left from its FIG. 2 position. Thus, as the fasetner separator 38 descends upon actuation of the limit switch 37 by the abutment 28 on the free end of the crank 26, the second slide fastener will be deposited on the left hand side of the precedingly deposited slide fastener in the receptacle 33.

With the continued rotation of the crankshaft 27, the next cycle of operation is conducted to carry the third slide fastener 11 away from the fastener receiving plate 12 into the receptacle 33. As the lever 22 swings this time into abutting contact with the heart cam 34, the latter is already angularly displaced another 18 degrees, so that the third slide fastener is deposited further on the left hand side of the second slide fastener in the receptacle 33.

Thereafter, the heart cam 34 repeats 18 degrees angular displacement each time the suction member 16 reciprocates between the receptacle 33 and the fastener receiving plate 12. The angular position where the lever 22 is restrained from its clockwise swing correspondingly shifts in the counterclockwise direction by suitable increments, and the stationary position of the suction member 16 over the receptacle 33 gradually shifts to the left. The successive slide fasteners 11 are thus loaded into the receptacle 33 in neat side-by-side arrangement.

As the suction member 16 reciprocates ten times between the fastener receiving plate 12 and the receptacle 33 in this manner, the heart cam 34 completes 180 degrees rotation on the camshaft 35. Thus, during the time interval when the heart cam 34 rotates from its angular position of FIG. 2, where its pointed tip 46 is located on the right hand side of the camshaft 35, to that of FIG. 3, where the heart cam tip is located on the left hand side of the camshaft, a total of ten slide fasteners are loaded into the receptacle 33.

Figure 3:
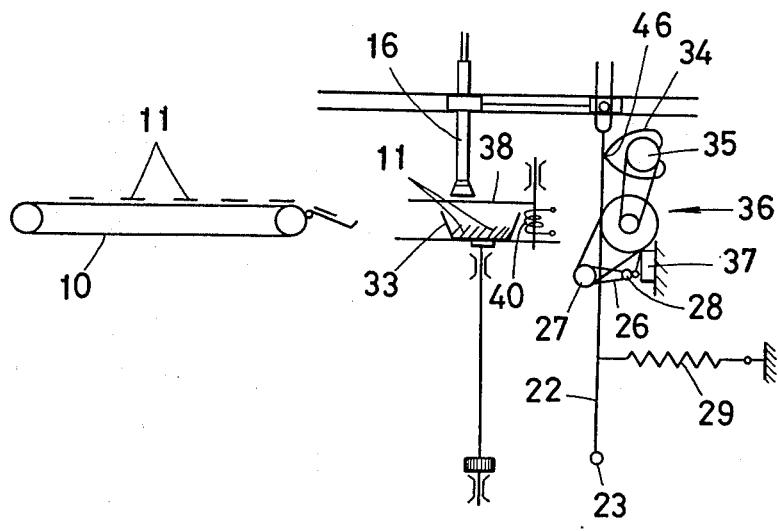

When the heart cam 34 attains the angular position of FIG. 3, the lever 22 swinging clockwise on the pivot 23 moves into abutting engagement with its pointed tip 46, so that the suction member 16 is retained in its predetermined most leftward position over the receptacle 33. Thereafter, each time the heart cam 34 is angularly displaced 18 degrees with each complete revolution of the crank 26, that is, each time one slide fastener is transported by the suction member 16, the angular position where the lever 22 moves into abutting engagement with the heart cam on its clockwise swing gradually shifts in the clockwise direction. The successive slide fasteners 11 deposited into the receptacle 33 correspondingly shift to the right, and, of course, these slide fasteners are likewise arranged in neat side-by-side relationship over the precedingly formed layer of ten slide fasteners.

Another ten slide fasteners are thus loaded into the receptacle 33 during the time interval when the heart cam 34 rotates from its angular position of FIG. 3, where its pointed tip 46 is located on the left hand side of the camshaft 35, to that of FIG. 4, where the heart cam tip is again located on the right hand side of the camshaft. A total of twenty slide fasteners are now contained in the receptacle 33 in two layers, each layer consisting of ten slide fasteners in neat side-by-side arrangement.

When the heart cam 34 attains the angular position of FIG. 4, its pointed tip 46 actuates the limit switch 45 as previously mentioned. Upon actuation of this limit switch 45, the piston rod 43 of the cylinder 44 advances or retracts to impart 180° rotation to the shaft 30 and hence to the platform 32 in either direction via the rack-and-pinion arrangement, as illustrated in FIG. 5. As a consequence, as will be seen from the showings of FIGS. 6A and 6B, the receptacle containing the twenty slide fasteners therein is also angularly displaced 180° with the platform 32.

The next slide fastener, that is, the twenty-first, deposited into the receptacle 33 through the above described procedure is therefore arranged in the opposite direction with respect to the preceding twenty fasteners. That end 47 of the twenty-first slide fastener which carries the slider thereon (hereinafter referred to as the thick end) is arranged over those ends 48 of the preceding twenty fasteners which carry no sliders thereon (hereinafter referred to as the thin ends), whereas the thin end 48 of the twenty-first fastener is arranged over the thick ends 47 of the preceding twenty fasteners. A further ten slide fasteners are thus deposited in neat side-by-side arrangement over the preceding twenty fasteners in the receptacle 33 until the heart cam 34 rotates back to the angular position of FIG. 3, as will be seen from a consideration of FIG. 6C.

To the moment when the heart cam 34 assumes the angular position of FIG. 4 again, an additional ten slide fasteners are similarly arranged side by side over the preceding three layers of slide fasteners. The limit switch 45 is then re-actuated by the pointed tip 46 of the heart cam 34, with the result that the piston rod 43 of the cylinder 44 retracts or advances to impart 180° rotation to the shaft 30 and thence to the platform 32 via the rack-and-pinion arrangement. The receptacle 33 containing the forty slide fasteners in four layers is this again angularly displaced 180° with the platform 32.

Since the receptacle 33 is turned in the opposite direction each time twenty slide fasteners are deposited therein in two layers as hereinbefore explained, the slide fasteners with their thick ends 47 and thin ends 48 can be evenly stacked up therein, practically without any possibility of collapsing. It is noteworthy that if the rotatable shaft 30, that is, the axis of rotation of the receptacle 33 on the platform 32, is suitably located out of alignment with the position where each slide fastener is dropped from the suction member 16, then the thick ends 47 of the slide fasteners in each two consecutive layers will project beyond the thin ends 48 of the slide fasteners in the preceeding two consecutive layers. In this manner the number of the slide fastener layers to be formed in each receptacle 33 can be significantly increased.

Although the electrical controls involved in the operation of this apparatus are not specifically illustrated because of their common and well known nature, it will be apparent that the apparatus can be operated full automatically in accordance with a predetermined program. Furthermore, while the apparatus has been shown and described hereinbefore as adapted specifically for loading the successive manufactured slide fasteners into the receptacle, it will be understood that the apparatus is easily adaptable for handling other articles of more or less similar character.

Having thus described the several useful and novel features of the apparatus according to the invention, it is believed that the many objects for which it was designed have been fully accomplished. However, while only one of the various possible adaptations of the invention has been illustrated and described herein, certain additional modifications may well occur to those skilled in the art within the broad teaching hereof. The invention, therefore, should be intrepreted broadly and in a manner comprehensive of all such modifications remaining within the scope of the invention, as hereinafter sought to be defined by the appended claims.

What is claimed is:

1. In apparatus for loading articles into an open-top receptacle, the combination of:
   a receiving plate adapted to receive the articles successively at prescribed time intervals;
   a suction member communicating with a source of vacuum and having a suction port to which the article on said receiving plate is caused to attach by suction;
   a platform supporting said recepticle thereon;
   means for reciprocating said suction member between a first position over said receiving plate and a second position over said receptacle on said platform, said reciprocating means including a lever;
   means for arresting the motion of said suction member which has traveled from said first to said second position with the article attached to said suction port, said arresting means being effective to horizontally shift said second position of said suction member by increments relative to said receptacle each time said suction member brings the article from said first position, said arresting means including a movable element which engages said lever of the reciprocating means to determine the different second positions; and
   means for causing the article to drop into said receptacle from said suction port of said suction member in said second position thereof.

2. The combination as set forth in claim 1, wherein said receiving plate is pivotable between a first position for receiving the successive articles and a second position for causing attachment of the received article to said suction port of said suction member.

3. The combination as set forth in claim 1, wherein said reciprocating means comprises:
   a guide channel extending horizontally over said receiving plate and said receptacle on said platform, said suction member being supported by said guide channel so as to be slidable therealong;
   a slider slidably received in said guide channel, said slider being slidable therethrough simultaneously with said suction member;
   a lever pivotally supported at one end and operatively coupled to said slider at the other end whereby the swinging motion of said lever on said one end is translated into the sliding motion of said slider through said guide channel;
   resilient means biasing said lever in such a direction that said suction member tends to travel toward said second position thereof; and
   crank means capable of rotation to cause said lever to swing against the bias of said resilient means.

4. The combination as set forth in claim 3, wherein said arresting means comprises:
   rotatable cam means with which said lever swings into abutting engagement to stop said suction member in said second position; and
   means for rotating said cam means through a predetermined angle during each complete reciprocation of said suction member from said second to said first and back to said second position.

5. The combination as set forth in claim 4, wherein said rotating means is interposed between said crank means and said cam means to transmit the rotation of the former to the latter in a predetermined ratio of speed reduction.

6. The combination as set forth in claim 1 which further comprises cam means for shifting said second position of said suction member in one direction until a predetermined number of articles are loaded into said receptacle, and then in the opposite direction until said predetermined number of articles are again loaded into said receptacle, whereby the articles are arranged in layers in said receptacle.

7. The combination as set forth in claim 1, further comprising means for rotating said platform and thereofre said receptacle through a predetermined angle in a horizontal plane each time a predetermined number of articles are loaded into said receptacle.

8. The combination as set forth in claim 7, wherein said predetermined angle of rotation of said platform is 180°.

9. The combination as set forth in claim 1, further comprising electrical control means for automatic operation of said apparatus.

* * * * *